United States Patent [19]

Endo et al.

[11] Patent Number: 4,824,221
[45] Date of Patent: Apr. 25, 1989

[54] ELECTROCHROMIC DEVICE

[75] Inventors: Tatuso Endo, Yokohama; Tatsuo Niwa, Sakura, both of Japan

[73] Assignee: Nikon Corporation, Tokyo, Japan

[21] Appl. No.: 174,472

[22] Filed: Mar. 28, 1988

[30] Foreign Application Priority Data

Apr. 3, 1987 [JP] Japan .................. 61-82382

[51] Int. Cl.⁴ ........................ G02F 1/01; G02F 1/17
[52] U.S. Cl. .................................................. 350/357
[58] Field of Search .............. 350/357, 355, 356, 353

[56] References Cited

U.S. PATENT DOCUMENTS

| | | | |
|---|---|---|---|
| 3,521,941 | 7/1970 | Deb et al. | 350/160 |
| 4,283,121 | 8/1981 | Meyer | 350/357 |
| 4,350,414 | 9/1982 | Takahashi et al. | 350/357 |
| 4,660,939 | 4/1987 | Tsuchiya et al. | 350/357 |

FOREIGN PATENT DOCUMENTS 55-0103584  8/1980  Japan ..................... 350/357

Primary Examiner—Eugene R. Laroche
Assistant Examiner—Nathan W. McCutcheon
Attorney, Agent, or Firm—Shapiro and Shapiro

[57] ABSTRACT

An electrochromic device comprises a first electrode layer, a second electrode layer, an electrochromic layer provided between the first and second electrode layers, an electroconductive resin layer provided on the side opposite to the electrochromic layer with respect to the second electrode layer so as to contact the second electrode layer and a third electrode layer with resistance value lower than that of the second electrode layer. The third electrode layer is provided on the side opposite to the second electrode layer with respect to the electroconductive resin layer so as to contact the electroconductive resin layer. The electrochromic device further comprises means for giving a potential difference between the first electrode layer and the third electrode layer.

8 Claims, 2 Drawing Sheets

ELECTROCHROMIC DEVICE

BACKGROUND OF THE INVENTION

1. Field of the Invention

This invention relates to an electrochromic device.

2. Related Background Art

A phenomenon of reversible coloration through the reversible electrolytic oxidation or reduction reaction which occurs by application of a voltage is called electrochromism. By use of an electrochromic (hereinafter abbreviated as EC) substance exhibiting such phenomenon, attempts have been made to prepare an EC device (hereinafter abbreviated as ECD) which is colored or decolored by voltage operation and utilize the ECD for dose controlling device (e.g. fender mirror) or for numeral displaying device utilizing 7 segments since 20 years or before. For example, an ECD comprising a lower electrode layer, either one of a tungsten trioxide thin film as the EC substance or an insulating film such as silicon dioxide, and then the other, and finally an upper electrode layer successively laminated on a glass substrate (U.S. Pat. No. 3,521,941) has been known as the whole solid type ECD.

Since each layer of ECD is extremely thin film formation is performed according to vacuum thin film forming technique such as the reactive or non-reactive vacuum vapor deposition, the reactive or non-reactive ion plating, the reactive or non-reactive sputtering, CVD.

When a voltage as obtainable from a cell is applied on such ECD, the tungsten trioxide ($WO_3$) thin film is colored in blue. Then, when a reverse voltage to the same extent is applied on the ECD, the blue color of the $WO_3$ film is extinguished to become colorless. The mechanism of such coloration-decoloration has not yet been clarified in detail, but it has been understood that a small amount of water contained in the $WO_3$ thin film and/or the insulating film governs the coloration and decoloration of $WO_3$. The reaction scheme of coloration is estimated as follows.

Cathode side:

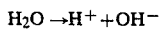

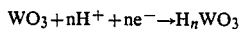

(colorless transparent):(blue)

Anode side:

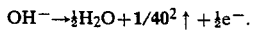

Afterwards, the objective type ECD added with a layer for oxidative reaction compensating for the reduction reaction of the $WO_3$ layer was invented (U.S. Pat. No. 4,350,414). FIG. 2 shows a sectional structure of such ECD.

At least one of a pair of electrode layers sandwiching the EC layer directly or indirectly therebetween must be transparent for permitting coloration and decoloration of the EC layer to appear to the outside. Particularly, in the case of the transmission type ECD, both must be transparent. As transparent electrode materials, there have been known up to date $SnO_2$, $In_2O_3$, ITO (mixture of $SnO_2$ and $In_2O_3$), ZnO, etc., but since these materials are relatively poor in transparency, they must be made thin. For this reason and other reasons, ECD is commonly formed on a substrate such as glass plate or plastic plate.

In FIG. 2, (A) shows a first electrode layer, (B) a reversible electrolytic oxidative layer or an oxidative colorable Ec layer (e.g., iridium oxideor hydroxide), (C) an ion electroconductive layer, (D) a reductive colorable EC layer (e.g. $WO_3$) and (E) a second electrode layer, respectively, and ECD is constituted basically of the laminated structure (A)-(E). However, as described above, such ECD is formed on a substrate (S). In FIG. 2, (R) is an encapsulating material such as epoxy resin, and (G) an encapsulating substrate for protection.

For supplying external power sources to the electrodes (A) and (E) of such ECD, take-out electrodes are respectively required, to which external wirings ($L_A$), ($L_E$) are respectively connected.

Whereas, as is necessarily required in the case of the transmission type ECD, the upper second layer electrode layer must be made a transparent electrode. Further, for making the response of coloration and decoloration rapid and preventing generation of coloration irregularity, the transparent electrode must be made to have a resistance as low as possible. Particularly, in an ECD with large display area, a second electrode layer with low resistance is preferred for the above characteristics.

However, although $SnO_2$, $In_2O_3$, ITO, ZnO, etc. have been known as transparent electrode materials, all of these materials will have high resistance when formed into films at relatively lower temperature, and low resistance when formed into films at relatively higher temperature.

In the case of the lower electrode layer, since the electrode layer is formed directly on the substrate, by use of the most general glass substrate as the substrate, which can stand high temperature, film formation can be effected at high temperature such as 300° to 400° C., whereby a transparent electrode layer with low resistance (which exhibits sheet resistance of 10 ohm or less) can be obtained. Here, sheet resistance refers to a resistance value between two electrodes when electrodes are respectively provided at one side of a layer shaped in a square with one side of 1 cm and at the other side opposed to said one side, and the thickness of the square layer is about 2000 Å.

In contrast, in the case of the upper electrode layer, various layers have been already formed on the substrate. Accordingly, when the temperature is made higher for the purpose of making lower the resistance of the upper electrode layer, the EC layer is exposed to high temperature, whereby there is involved the problem that the EC layer is remarkably deteriorated and, in an extreme case, ECD can be no longer actuated.

On the contrary, if the upper transparent electrode layer is formed at a low temperature which will not deteriorate the EC layer, a transparent electrode layer with higher resistance (which exhibits sheet resistance of 50 ohm or higher) is obtained, thus, giving rise to a problem that response of ECD is slow to generate coloration irregularity. This problem is particularly marked when the display area is large.

SUMMARY OF THE INVENTION

Accordingly, an object of the present invention is to provide an ECD with rapid response even in the case of an ECD with the upper electrode layer having high resistance and without generation of color irregularity even in the case of an ECD with large display area.

In the present invention, a third electrode layer with low resistance is formed previously on a second substrate, and this is superposed through the intermediary electroconductive resin on the upper electrode layer to integrate the both. To the third electrode layer is connected an external wiring and electrode take-out of the upper electrode layer is effected through the third electrode layer.

In the present invention, since the second electrode layer with high resistance is also in plane contact with the third electrode with low resistance through the intermediary electroconductive resin layer with low resistance, it becomes apparently lowered in resistance. Shortly speaking, when charges necessary for coloration through the external wire are first supplied to the third electrode layer, which has low resistance, charges are rapidly distributed through the whole layer, and then the charges are vertically migrated onto the upper electrode layer (migration distance of charges in the vertical direction is by far shorter as compared with the horizontal direction, namely the spreading direction of respective layers), and hence response is rapid and no coloration irregularity is generated. This is also the same in depriving of charges (or supplying of positive holes) during color extinction.

DESCRIPTION OF THE PREFERRED EMBODIMENTS

Figure 1:
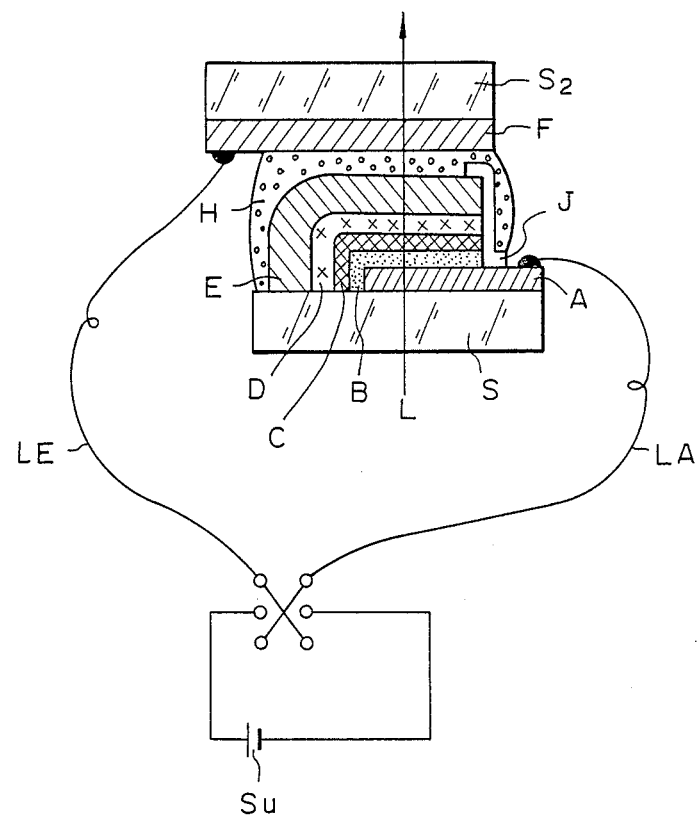
FIG. 1 is a schematic vertical sectional view of ECD according to example of the present invention.
Figure 2:
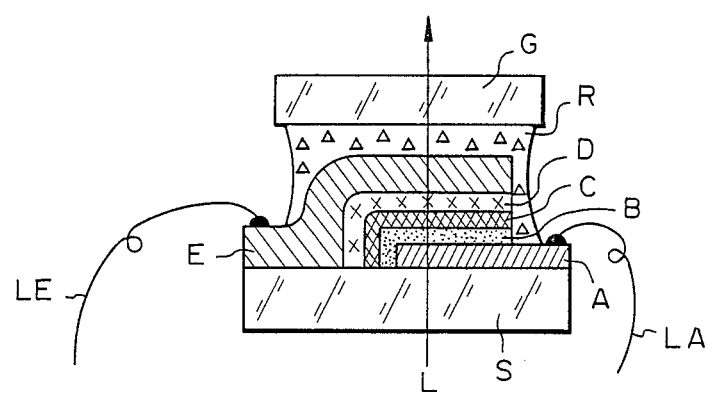
FIG. 2 is a schematic vertical sectional view of ECD of the prior art and comparative example.

To describe about the respective layers of ECD, ECD is constituted basically of a pair of electrode layers and EC layer sandwiched therebetween.

However, ECD of the type with an ion electroconductive layer inserted between the electrode layers in addition to EC layer is preferred. Further, when a reductive colorable EC substance is used such as $WO_3$ which is a typical EC substance, it is preferable to add a reversible electrolytic oxidative layer or an oxidative colorable EC layer.

As the first electrode layer (A) to be formed on the substrate, which may vary depending on whether the type of ECD is the transmission type or the reflection type, if it is required to be transparent, it may be constituted of the above transparent electrode material such as $SnO_2$, $In_2O_3$, ITO. These electrode layers will have low resistance when formed into films at relatively higher temperature such as 300° to 400° C., and high resistance when formed into films at relatively lower temperature such as 100° to 200° C. The film thickness may be generally 0.04 to 0.4 $\mu$m. If it is not required to be transparent, the first electrode layer (A) may be formed of a metal material or carbon. As the metal material, for example, gold, silver, aluminum, chromium, tin, zinc, nickel, ruthenium, rhodium, stainless steel, etc. may be employed. The metal electrode layer, even if the transparent electrode layer may be made to have low resistance, will have by far smaller resistance than that. The film thickness of the metal electrode layer may be generally 0.04 to 10 $\mu$m. If the film thickness is thick, the metal electrode layer will reflect light and not transmit it therethrough. Accordingly, in the reflection type ECD, either one of the upper electrode layer and the lower electrode layer is constituted of a metal.

As the reductive colorable EC layer (B), tungsten oxide, molybdenum oxide, etc. may be employed. In some cases, other organic or inorganic substances may be available. The film thickness may be generally 0.3 to 1 $\mu$m.

As the ion electroconductive layer (C) which may be optionally provided, there may be included, for example, (1) thin films of inorganic dielectric materials, such as tantalum oxide ($Ta_2O_5$), niobium oxide ($Nb_2O_5$), zirconium oxide ($ZrO_2$), titanium oxide ($TiO_2$), hafnium oxide ($HfO_2$), yttrium oxide ($Y_2O_3$), lanthanum oxide ($La_2O_3$), silicon oxide ($SiO_2$), magnesium fluoride, zirconium phosphate or thin films of mixtures of these (these thin films, depending on the preparation method, are insulating to electron, but well conductive to proton ($H^+$) and hydroxy ion ($OH^-$) and, by containing positively water during preparation, by exposing the film during thin film preparation or after ECD preparation to the air thereby to absorb water naturally from in the air, or by containing $H_2O$, $H^+$, $OH^-$ from anywhere in the system, will become ion electroconductive and yet will not transmit electrons); (2) solid electrolytes such as sodium chloride, potassium chloride, sodium bromide, potassium bromide, $Na_3Zr_2Si_2PO_{12}$, $Na_{1+x}ZrSi_xP_{3-x}O_{12}$, $Na_5YSi_4O_{12}$, $RbAg_4I_5$, etc. The ion electroconductive layer (C) has a film thickness generally of 0.1 to 2 $\mu$m.

As the substance to be used for the reversible electrolytic oxidative layer or the oxidative colorable EC layer (D), there may be employed organic substances such as styryl analogous compounds, allylpyrazoline, allylpyrilium, allylpyridium, methoxyfluorene, prussian blue complex, ruthenium purple complex, pentacyanocarbonyl iron complex, etc. or otherwise oxides or hydroxides of transition metals such as iridium, nickel, chromium, vanadium, ruthenium, rhodium, etc. Particularly, oxides or hydroxides of iridium which are diluted with an inert dispersing medium to Ir metal content of 1 to 20 atomic %, particularly 3 to 10 atomic % are preferred. As the transparent inert dispersing medium, there may be employed, for example, silicon oxide, tantalum oxide, niobium oxide, zirconium oxide, titanium oxide, hafnium oxide, yttrium oxide, lanthanum oxide, magnesium fluoride, tin oxide, indium oxide, ITO, etc. The layer (D) is a colorless or pale transparent film under normal state (stable state), with its thickness being generally 0.04 to 1 $\mu$m.

The second electrode layer (E) is assumed to comprise an electrode layer with high resistance in the present invention as described above.

In contrast, the third electrode layer (F) is an electrode layer having at least lower resistance than the second electrode layer (E). Accordingly, when a transparent electrode with high resistance obtained by film formation at lower temperature is used for the second electrode layer (E), a transparent electrode obtained by film formation at high temperature is used, or sometimes a metal electrode with by far lower resistance is used for the third electrode layer (F).

Generally, the third electrode layer (F) is formed on the second substrate ($S_2$). This is particularly because the third electrode constituted of a transparent electrode material is extremely thin and has no self-supporting property. However, when a third electrode layer (F) made of a metal plate is used, it has self-supporting property. However, when a third electrode layer (F) made of a metal plate is used, it has self-supporting property and hence no second substrate (S₂) is required. For the second substrate (S₂), it is preferable to use a glass substrate which also functions as the encapsulating substrate.

The electroconductive resin layer (H) is required to have low resistance (generally 10 K$\Omega$/cm$^2$ or less, preferably 100$\Omega$/cm$^2$ or less, per unit area in the vertical direction), and generally comprises a mixture of electroconductive powder and a resin.

As the electroconductive powder, there may be employed, for example, metal powder of Al, Ag, Ni, Pt, Au, Pd, Cr, Ta, Ir, Ru, Rh, etc., or electroconductive oxide powder such as ITO, SnO$_2$, In$_2$O$_3$, etc., or carrier powder having these substances attached on the surface thereof. The particle size of powder may be generally suitable in the range of 1 to 300 $\mu$m, particularly preferably 5 to 30 $\mu$m. With particle sizes in such range, the electrical resistance of the resin layer (H) is low, whereby transmittance of light will not be obstructed so much. The resin layer (H) also functions as the protective layer for the electrochromic device and therefore is formed so as to cover the layers (B), (C) and (D), while the insulating layer (J) prevents the electrode layers (A) and (F) from being electrically connected to each other.

The electroconductive powder may be suitably mixed in an amount of 0.1 to 50 parts by weight, particularly 1 to 10 parts by weight, per 100 parts by weight of the resin. With an amount within such range, the electric resistance of the resin layer (H) is low, whereby transmittance of light will not be obstructed so much.

As the resin constituting the electroconductive resin layer (H), it must be at least liquid when the second electrode layer (E) is superposed on the third electrode layer (F) (for, if it is solid, gap is liable to be formed between the both layers, whereby interlayer resistance or contact resistance will be increased), and thereafter may be either liquid as such or cured. One which will be cured to firmly bond the second electrode layer (E) to the third electrode layer (F) is preferable, since when a second substrate is used, it can be also used as the encapsulating substrate.

The resin, when its adhesiveness is taken into consideration, may be preferably a thermosetting resin such as epoxy resin, urethane resin, unsaturated polyester, phenol resin, etc. or its precursor or a polymerizable monomer (e.g. acrylate such as methyl (meth) acrylate, ethyl (meth) acrylate, propyl (meth) acrylate, hydroxyethyl (meth) acrylate, etc., styrene). However, it is preferred that curing should proceed at normal temperature or slightly heated temperature. For, at high temperature, there is the fear that the EC layer may be deteriorated. If no adhesion is considered, for example, polyvinyl alcohol, CMC, agar, gelatin, etc. may be also available.

The thickness of the electroconductive resin layer (H) may be preferably thin for the purpose of making the interlayer resistance or contact resistance lower, and is generally 5 to 300 $\mu$m, particularly preferably 5 to 50 $\mu$m. At these thicknesses, light will sufficiently transmit therethrough.

The present invention is described in more detail by referring to the following examples, by which the present invention is not limited at all.

(Example)

FIG. 1 is a schematic sectional view of ECD of this Example. The Figure is partially deformed and has no accurate dimensional ratio.

(1) First, a glass substrate (S) with a large area of 200 mm $\times$ 200 mm $\times$ 1 mm is prepared, and a low resistance electrode layer comprising an ITO film with a film thickness of 0.15 $\mu$m and a sheet resistance of 8 ohm was formed thereon. Next, a first electrode layer (A) was formed by patterning according to photoetching. In place of photoetching, patterning may be also effected initially by mask vapor deposition.

(2) Next, an oxidative colorable EC layer (B) comprising an iridium oxide-tin oxide mixed film with a film thickness of 0.12 $\mu$m was formed by reactive vacuum vapor deposition.

(3) A transparent ion electroconductive layer (C) comprising a tantalum pentaoxide with a film thickness of 0.7 $\mu$m was formed by vapor deposition thereon.

(4) Further, a reductive colorable EC layer (D) comprising a tungsten trioxide film with a film thickness of 0.5 $\mu$m was formed by vapor deposition.

(5) A second electrode layer (E) comprising an ITO film with a film thickness of 0.15 $\mu$m and a sheet resistance of 60 ohm was further formed thereon by vacuum vapor deposition (substrate temperature: 150° C.).

(6) Separately, a second substrate (S$_2$) of the same material as the substrate (S) was prepared and a third electrode layer and similarly a third electrode layer (F) comprising a low resistance ITO film with a film thickness of 0.15 $\mu$m and a sheet resistance of 8 ohm was formed.

To the end of the third electrode layer (F) was connected an external wiring (L$_E$).

(7) Finally, 30 parts by weight of a curing agent were mixed with 70 parts by weight of the main epoxy resin ingredient and, after thorough mixing, 5 parts by weight of metallic Ni powder with particle size of 10 $\mu$m were mixed, followed by thorough mixing of the whole. Before this mixture began to be cured, it was applied on the second electrode (E), and the third electrode (F) was superposed thereon. The epoxy resin was cured by standing at normal temperture for 20 hours to form an electroconductive resin layer (H) with a layer thickness of 10 $\mu$m. The resistance value per unit area in the vertical direction of the resin layer (H) was 100 $\Omega$/cm$^2$.

(8) To the end of the lower electrode layer (A) of the ECD thus obtained was connected an external wiring (L$_A$).

(9) When a coloration voltage (+1.35 V) was applied from a driving power source (Su) through the external wirings (L$_A$), (L$_E$) on the transmission type ECD, the time required for reducing the transmittance of the light (L) with wavelength of 633 nm permitted to enter from the substrate side was 5 seconds. This transmittance was maintained for a while, even when the voltage application was stopped. Next, when a color extinction voltage (−1.35 V) was applied, the time required for restoration of the transmittance similarly to 70% was 2 seconds. These changes of coloration and color extinction were uniformly changed in density without generation of coloration irregularity.

Also, an ECD was prepared by use of an electroconductive resin layer (H) containing 1 part by weight of A1 powder with particle size of 5 $\mu$m mixed per 100 parts by weight of the epoxy resin, which exhibited similar characteristics. In the case of A1 powder, due to presence of luster, aesthetic characteristic in appearance is high and there is also the fender effect.

(Comparative example)

FIG. 1 is a schematic sectional view of ECD of this example. The Figure is partially deformed and has no accurate dimensional ratio.

(1) First, a glass substrate (S) with a large area of 200 mm ×200 mm ×1 mm was prepared, and a lower electrode layer (A), an oxidative colorable EC (B), a transparent ion electroconductive layer (C), a reductive colorable EC layer (D) and an upper electrode layer (E) with a sheet resistance of 60 ohm were formed similarly as described in Example.

(2) Next, to the end of the lower electrode layer (A) and the end of the upper electrode layer (E), external wirings ($L_A$), ($L_E$) were connected, and an epoxy resin was coated as the encapsulating resin on the upper electrode layer (E), followed by standing with the same encapsulating substrate (G) as the second substrate pressed thereon to cure the epoxy resin, thereby preparing an ECD.

(3) When coloration voltage (+1.35 V) was applied from a driving power source (Su) through the external wirings ($L_A$), ($L_E$) on the transmission type ECD, the time required for reducing the transmittance of the light (L) permitted to enter from the substrate (S) side was 30 seconds. Next, when color extinction voltage (−1.35 V) was applied, the time required for restoration of the transmittance similarly to 70% was 15 seconds. These changes of coloration and color extinction became partially dense with marked color irregularity.

We claim:

1. An electrochromic device comprising:
    a first electrode layer;
    a second electrode layer;
    an electrochromic layer provided between said first and second electrode layers;
    an electroconductive resin layer provided on the side opposite to the electrochromic layer with respect to said second electrode layer so as to contact said second electrode layer;
    a third electrode layer with a resistance value lower than that of said second electrode layer, said third electrode layer being provided on the side opposite to said second electrode layer with respect to said electroconductive resin layer so as to contact said electroconductive resin layer; and
    means for giving a potential difference between said first electrode layer and said third electrode layer.

2. An electrochromic device according to claim 1, wherein said electroconductive resins comprises a mixture of electroconductive powder and a resin.

3. An electrochromic device according to claim 2, wherein said electroconductive powder is metal powder such as of Al, Ag, Ni, Pt, Au, Pd, Cr, Ta, Ir, Ru, or Rh, or electroconductive oxide powder such as ITO, $SnO_2$, or $In_2O_3$, or carrier powder having these substances attached on the surface thereof.

4. An electrochromic device according to claim 2, wherein said electroconductive powder has particle sizes of 1 to 300 μm.

5. An electrochromic device according to claim 2, wherein said electroconductive powder is mixed in an amount of 0.1 to 50 parts by weight based on 100 parts by weight of the resin.

6. An electrochromic device according to claim 1, further having an insulating layer which prevents said electrochromic layer from being connected to said electroconductive resin layer.

7. An electrochromic device according to claim 6, further having an ion electroconductive layer formed between said first electrode layer and said second electrode layer.

8. An electrochromic device according to claim 7, wherein said ion electroconductive layer is provided so as to contact said electrochromic layer.

* * * * *